Sept. 23, 1958  R. J. HOLTON ET AL  2,852,829
CLIP FOR CABLES, WIRES, MOLDINGS AND THE LIKE
Filed July 26, 1955
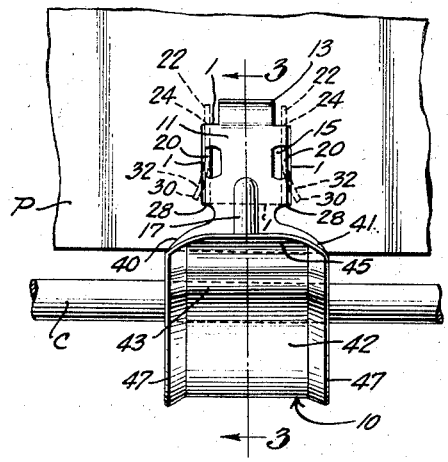
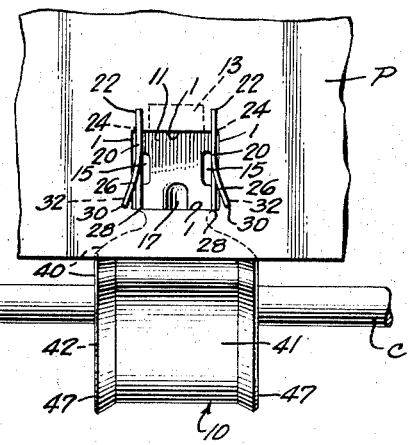
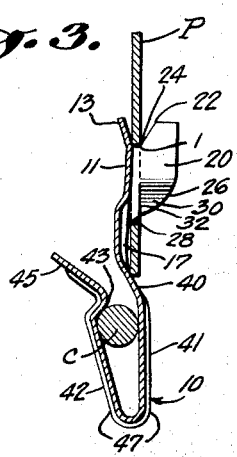
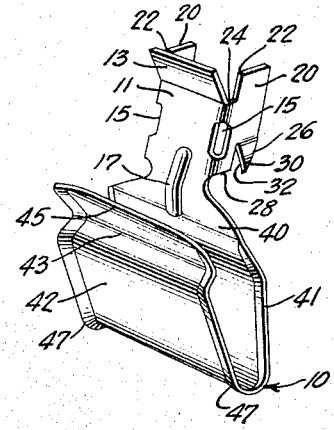
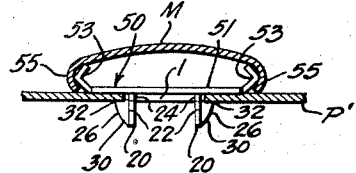
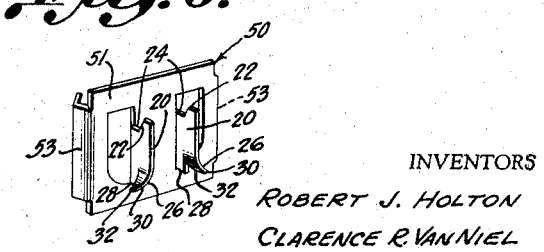
INVENTORS
ROBERT J. HOLTON
CLARENCE R. VAN NIEL
BY
H. G. Lombard
ATTORNEY

United States Patent Office 2,852,829
Patented Sept. 23, 1958

2,852,829

CLIP FOR CABLES, WIRES, MOLDINGS AND THE LIKE

Robert J. Holton and Clarence R. Van Niel, Cleveland, Ohio, assignors to Tinnerman Products, Inc., Cleveland, Ohio, a corporation of Ohio Application July 26, 1955, Serial No. 524,470

7 Claims. (Cl. 24—73)

This invention relates in general to fasteners in the form of sheet metal clips, or the like, for securing an object or article onto a supporting plate or panel, and deals, more particularly, with an improved construction by which such clips are adapted to be easily and quickly secured to an apertured supporting panel in a fixed, positively locked attachment of relatively high strength and durability compared to heretofore known fasteners of this character.

Many types of sheet metal clips or fasteners, and the like, comprise a shank or stud portion composed of co-operating yieldable shank elements which are secured in a panel opening by little more than frictional surface engagement of such shank elements with the wall of the panel opening. Fasteners of this character have been found to result in an entirely inordinate number of faulty, loose installations due to the fact that such snap fastening shank elements have a decided tendency to snap out of the panel opening just as readily as they are snapped in, particularly in instances where the installation is subject to constant jarring and vibration effects such as takes place in the operation of an automobile, for example.

The improved clips or fasteners of this invention, likewise, comprise cooperating shank elements but in a special construction in which the edge portions of said shank elements are utilized to provide the attaching means of the clip in the form of hooks and cooperating locking shoulders or detents, and the like, having a pronounced positive edge engagement with adjacent marginal portions of the panel opening, and in a manner whereby such attaching means actually develop a much greater maximum strength and durability approximating substantially the tensile strength of the sheet metal from which the clips are made.

A primary object of the invention, therefore, is to provide an improved clip construction of this character in which the clip comprises cooperating shank elements in face to face relation with the edge portions of said shank elements formed with cooperating hooks adapted to extend through a panel opening and seat in edge engagement with a marginal portion of the panel opening in attached position together with abutments provided on opposite edge portions of said shank elements and engageable with the wall of the panel opening to retain said hooks in said attached position of the clip in the panel opening.

Another object of the invention is to provide such a clip construction together with locking shoulders or detents on said shank elements which are engageable with marginal portions of the panel opening at the underside of the panel to provide a positive lock of the clip in attached position in the panel opening.

A further object of the invention is to provide various forms of clips or fasteners such as described in the manner of simple, one-piece sheet metal devices which are cheap and inexpensive to manufacture and lend themselves to economical quantity production in that they may be provided at relatively low cost from ordinary sheet metal strip stock with little loss or waste of material.

Further objects and advantages of the invention will be apparent as the following description proceeds with reference to the accompanying drawings, for purposes of illustration but not of limitation, in which like reference characters designate like parts throughout, and in which:

Fig. 1 illustrates an assembly in which the improved clip or fastener of the invention is shown in top plan as secured in an opening in a supporting plate or panel to provide a mounting for a cable or other object thereon;

Fig. 2 is a bottom plan view of the assembly seen in Fig. 1 showing the clip as secured in the panel opening at the underside of the panel;

Fig. 3 is a sectional view of Fig. 1 along line 3—3, looking in the direction of the arrows; and, Fig. 4 is a perspective view of the clip or fastener per se shown employed in Figs. 1-3, inclusive.

Fig. 5 is a sectional view showing the clip or fastener of the invention as provided in the form of a molding clip and secured in a panel opening to provide a mounting for a molding, or the like, on a supporting plate or panel; and, Fig. 6 is a perspective view of the clip or fastener shown employed in Fig. 5.

Referring now, more particularly, to the drawings, Figs. 1-4, inclusive, show the invention as provided in a preferred form of cable clip or clamp for securing one or more cables, C, tubing, wires, or similar elongate objects, in mounted position on a supporting panel or plate P. Installations of this character have a wide range and variety of applications and uses in automobiles as the means for mounting a combination of conduits such as one or more electrical wires or cables and a gasoline pipe, for example. The panel P is provided with a fastener receiving opening 1 which may be of round, rectangular or other suitable outline so long as it is of a size proportionate to the shank or stud portion of the clip or fastener to be employed to provide for a positive lock thereof in the panel opening, as presently to be described. Preferably the panel opening 1 is provided as a simple, generally rectangular hole formed at the same time that the plate or panel P is fabricated.

The clip or fastener, designated generally 10, is a simple inexpensive device which may be constructed of any suitable sheet metal, preferably spring metal or cold rolled metal having spring-like characteristics. The device may be formed from blanks of various outlines, of course, but from a quantity production standpoint, is most advantageously provided from a comparatively small, generally rectangular sheet metal section which is readily obtained from standard sheet metal strip stock with little loss or waste of material.

The sheet metal section is so provided as to define an attaching portion for securing the clip or fastener 10 in the panel opening 1 and an article holding portion for mounting any suitable object on the supporting panel P, or for retaining an article such as a bolt or screw for securing a cooperating part to said supporting panel P. In the clip or fastener of Figs. 1-4, inclusive, the attaching portion is provided from one end of the sheet metal section in the form of a generally channel shaped shank comprising a base 11 intermediate a pair of spaced side flanges or shank elements 20 extending lengthwise of said base 11. The outer end of said base 11 is severed from said spaced side flanges 20 and bent to provide an outwardly flared guide lip 13 for facilitating attachment of the clip in the panel opening 1, as presently to be described. Perforations 15 at the junctions of said spaced side flanges 20 with said base 11 facilitate the bending and forming of said flanges 20, and said base 11, otherwise, preferably is provided with a lengthwise corrugation 17 which strengthens and reinforces said base in the area in which it is connected to the adjoining article holding portion of the clip or fastener.

The spaced side flanges 20 have a spacing slightly less than the width of the panel opening 1 and at their outer or forward ends are provided with suitable notches or cutouts which define substantial hooks 22 on the forward edges thereof. These hooks 22 taper in diverging relation to the base 11 and flared lip 13 and extend from adjacent recesses at the inner ends of said notches or cutouts which define abutments 24 of a size corresponding substantially to the thickness of the panel P or other work adjacent the panel opening 1. The hooks 22, thus provided, are adapted to pass through the panel opening 1 and bear on the opposite side of the panel adjacent said opening, as seen in Fig. 3, with the abutments 24 snugly engaging the adjacent end edge of said panel opening.

The spaced side flanges 20 have their opposite or rearward ends provided as curved or rounded guide edges 26 leading to rearward abutments 28 adjoining the base 11 and spaced from the forward abutments 24 a distance slightly less than the length of the panel opening 1 such that said abutments 24, 28, respectively, are adapted to seat snugly in abutting relation to the opposite end walls or end edges of said panel opening 1.

The curved guide edges 26 are intersected by transverse slits in the rear end portions of said spaced side flanges 20 to define tongues 30 and pronounced shoulders 32 on the upper edges of said tongues 30. Shoulders or detents similar to the shoulders 32 may be provided on said spaced side flanges 20 in any suitable way so long as they are spaced from the base 11 a distance approximating the thickness of the panel adjacent the panel opening 1. In the present preferred construction, said shoulders or detents 32 are defined by the upper edges of the tongues 30, and said tongues bent outwardly in diverging relation in a manner whereby said shoulders 32 project normally outwardly out of the planes of said side flanges 20 in a spacing greater than the width of the panel opening 1 but adapted to flex inwardly as necessary to pass through said panel opening and spring outwardly into fastening engagement with marginal portions of said panel opening at the opposite side of the panel P in the attached position of the clip.

The clip or fastener 10 is provided with an article holding portion formed from an extension 40 to the base 11. In the cable clamp type of fastener shown in Figs. 1–4, inclusive, such an extension 40 is provided in a return bend defining a pair of spring arms 41, 42 adapted to cooperate in clasping one or more articles C, such as cables, conduits, tubing, or the like. The spring arm 42 is formed with an inward abutment 43 which merges into an outwardly flared, relatively long free end 45 that facilitates the introduction of the cables or conduits to be retained between said spring arms 41, 42. Preferably, the spring arms 41, 42 are provided with rounded longitudinal edge portions 47 which minimize possible chafing of the articles secured thereby due to vibration effects, and the like.

The clip or fastener 10, thus provided, is easily and quickly applied to a positively locked attachment in the panel opening 1 simply by canting the fastener upwardly as necessary to insert the projecting ends of the hooks 22 into and through said panel opening 1 until the adjoining abutments 24 engage or are in position to engage the adjacent end edge of said panel opening as seen in Fig. 3. The outwardly flared lip 13 on the base 11 facilitates this initial step in the attachment of the clip, and with the hooks 22 thus inserted in the panel opening 1, the opposite curved or rounded guide edges 26 on said side flanges 20 are in position to slide or ride over the opposite end edge of said panel opening 1. The clip is then lowered and pressure exerted on the base 11 to cause said curved or rounded guide edges 26 to ride on the adjacent end edge of the panel opening in the manner of cam elements, thereby moving the clip slightly forwardly to force the forward abutments 24 into engagement with the end edge of the panel opening 1 adjacent thereto; at the same time, the rearward abutments 28, at the extremities of said curved or rounded guide edges 26, slide into engagement with the opposite end edge of said panel opening 1 in the fully attached position of the clip.

As the curved or rounded guide edges 26 lead the abutments 28 into engagement with the adjacent end edge of the panel opening 1, the outwardly diverging tongues 30 cam against the side edges of the panel opening 1 and are thereby caused to flex inwardly as necessary to permit said tongues 30 to enter and pass through said panel opening to a position in which the shoulders 32 on the upper edges of said tongues 30 clear the underside of the panel P and spring outwardly into overlying positive abutting relation to the adjacent marginal portions of said panel opening as shown in Figs. 1 and 2. The shoulders 32 thus cooperate with the hooks 22 in providing a positive lock of the clip in fully attached position in the panel opening 1.

In this relation, it will be appreciated that the opposite abutments 24 and 28, respectively, cooperate in engaging opposite end edges of the panel opening 1 to prevent lengthwise shifting or displacement of the clip in such fully attached position. The side flanges 20 preferably have a predetermined spacing slightly less than the width of the panel opening, as aforesaid, such that the portions of said side flanges 20 adjacent the base 11 are disposed in abutting relation to the side edges of the panel opening 1 to prevent sidewise shifting or displacement in the attached position of the clip. The clip is thus fixedly attached in the panel opening 1 against both lengthwise and sidewise shifting or displacement in cooperation with the hooks 22 and shoulders or detents 32 which are positively locked in the panel opening 1 in the attached position of the clip, as aforesaid, in a manner whereby there is little possibility of accidental or unintended removal of the clip from such attached position under the most severe service conditions.

It is also to be appreciated that in the improved clip or fastener of the invention, the shank is defined by the spaced side flanges 20 having the hooks 22 and shoulders or detents 32 provided on the edge portions thereof in such a way that said shank elements actually develop a maximum strength and durability approximating the tensile strength of the sheet metal from which the clip is made.

In the event that it is necessary or desirable to remove a clip 10 from attached position, this is easily and quickly effected simply by compressing the tongues 30 to permit the shoulders 32 thereon to pass through the panel opening 1 in the reverse direction from which the same were applied, whereupon said shoulders 32 are released from engagement with the panel P and the clip may then be manipulated to withdraw the hooks 22 from the panel opening 1 and separate the clip from the panel. No deformation or distortion takes place in the removal of the clip and the elements thereof readily assume their initial normally untensioned condition such that the clip may be again applied in the same or similar assembly in a repetition of the foregoing described procedure.

Figs. 5 and 6 disclose the invention as provided in the form of a clip or fastener 50 for mounting a molding M or other channel-shaped object in a procedure wherein both the fastener and molding may be applied in an operation taking place entirely from the forward side of the supporting panel P' in an installation which is especially advantageous in blind locations where the rearward side of the panel is not conveniently or readily accessible. This form of clip or fastener comprises the same general type of shank provided by a pair of similar spaced flanges 20 stamped from the sheet metal base 51 and defining the spaced hooks 22 and cooperating shoulders or detents 32. On the ends or sides of the base 51 there are provided suitable spring arms 53 onto which side flanges 55 of the molding M or other channel-shaped object may be sprung to be retained fixedly and rigidly in mounted position on the supporting panel P', substantially as shown in Fig. 5, it being understood that as many clips or fasteners 50 as are necessary are attached to the supporting panel P' along the path which the molding M extends in mounted position and are secured in individual panel openings 1 substantially in the manner described with reference to Figs. 1 to 4, inclusive.

The improved clip or fastener in any form preferably is constructed of relatively thin sheet metal the thickness and width of which is selected according to service requirements and the predetermined size of the parts of the assembly or the articles to be secured. The fastener is most effective when provided of spring metal suitably tempered and otherwise treated to give the desired toughness and hardness, particularly in the case of assemblies which are subject to extreme conditions of vibration. A cheap and highly satisfactory clip or fastener may be provided from cold rolled metal such as cold rolled steel which is untempered but of a spring metal nature and capable of providing an effective and reliable securing device, as and for the purposes described.

While the invention has been described in detail with specific examples, such examples are intended as illustrations only inasmuch as the invention fully contemplates various changes and modifications which may be provided without departing from the spirit and scope of the invention.

What is claimed is:

1. A clip for securing an article to a panel comprising a sheet metal body defining a base, article engaging means integral with said base, a shank comprising a pair of flanges projecting from the underside of said base in substantially parallel and spaced relation, said flanges each having one end provided with a cutout defining an abutment adjacent said base and a hook extending outwardly from said abutment, said flanges being receivable in an opening in said panel in attached position with said base at one side of said panel and said hooks extending through said panel opening and engaging the reverse side of said panel adjacent said opening with said abutment in abutting relation to the wall of said opening, said flanges having their opposite ends provided with cooperating abutments adapted to engage an opposite wall of said panel opening to retain said flanges against lengthwise shifting in said attached position in said panel opening, said flanges having partially severed portions providing shoulders projecting outwardly from said flanges and adapted to engage said reverse side of the panel adjacent said panel opening to lock said flanges in said attached position in said panel opening.

2. A clip for securing an article to a panel comprising a sheet metal body defining a base, article engaging means integral with said base, a shank comprising a pair of flanges projecting from the underside of said base in substantially parallel and spaced relation, said flanges each having one end provided with a cutout defining an abutment adjacent said base and a hook extending outwardly from said abutment, said flanges being receivable in an opening in said panel in attached position with said base at one side of said panel and said hooks extending through said panel opening and engaging the reverse side of said panel adjacent said opening with said abutment in abutting relation to the wall of said opening, said flanges having their opposite ends provided as outwardly curved cam edges leading to cooperating abutments adapted to engage an opposite wall of said panel opening to retain said flanges against lengthwise shifting in said attached position in said panel opening, said flanges having partially severed portions adjacent said cooperating abutments providing tongues bent outwardly in diverging relation to said flanges and defining shoulders in spaced relation to said base, said shoulders being adapted to engage said reverse side of the panel adjacent said panel opening to lock said flanges in said attached position in said panel opening.

3. A clip for securing an article to a panel comprising a sheet metal body defining a base, article engaging means integral with said base, a shank comprising a pair of flanges projecting from the underside of said base in substantially parallel and spaced relation, said flanges each having one end provided with a cutout defining an abutment adjacent said base and a hook extending outwardly from said abutment, said flanges being receivable in an opening in said panel in attached position with said base at one side of said panel and said hooks extending through said panel opening and engaging the reverse side of said panel adjacent said opening with said abutment in abutting relation to the wall of said opening, said flanges having their opposite ends provided as outwardly curved cam edges leading to cooperating abutments adapted to engage an opposite wall of said panel opening to retain said flanges against lengthwise shifting in said attached position in said panel opening, said flanges having slits adjacent said cooperating abutments extending substantially parallel to said base and providing tongues having free ends bent outwardly in diverging relation to said flanges and upper edges defining shoulders in spaced relation to said base, said shoulders being adapted to engage said reverse side of the panel adjacent said panel opening to lock said flanges in said attached position in said panel opening.

4. A clip as claimed in claim 3 in which said article engaging means comprises an extension integral with said base and having a return bent portion forming a resilient clip for mounting one or more cables, conduits or similar articles on said panel.

5. A clip as claimed in claim 3 in which said article engaging means comprises spaced portions of said base bent to define outwardly extending spring arms for engaging the flanges of a molding or similar article to be mounted on said panel.

6. A clip for securing an article to a panel comprising a sheet metal body defining a base, article engaging means integral with said base, and a shank comprising a pair of flanges projecting from the underside of said base in substantially parallel and spaced relation, said flanges each having one end provided with a cutout defining an abutment adjacent said base and a hook extending outwardly from said abutment, said flanges being receivable in an opening in said panel in attached position with said base at one side of said panel and said hooks extending through said panel opening and engaging the reverse side of said panel adjacent said opening with said abutment in abutting relation to the wall of said opening, at least one flange having its opposite end provided with a cooperating abutment adapted to engage an opposite wall of said panel opening to retain said flange against lengthwise shifting in said attached position in said panel opening, each of said flanges having a tongue extending outwardly from the plane of the corresponding flange and adapted to engage said reverse side of the panel adjacent said panel opening to lock said flange in said attached position in said panel opening, said tongues being bent outwardly in diverging relation in a spacing greater than the width of the opening and adapted to flex inwardly to pass through the opening.

7. A clip for securing an article to a panel comprising a sheet metal body defining a base, article engaging means integral with said base, and a shank comprising a pair of flanges projecting from the underside of said base in substantially parallel and spaced relation, said flanges each having one end provided with a cutout defining an abutment adjacent said base and a hook extending outwardly from said abutment, said flanges being receivable in an opening in said panel in attached position with said base at one side of said panel and said hooks extending through said panel opening and engaging the reverse side of said panel adjacent said opening with said abutment in abutting relation to the wall of said opening, said flanges having their opposite ends provided as outwardly curved cam edges leading to cooperating abutments adapted to engage an opposite wall of said panel opening to retain said flanges against lengthwise shifting in said attached position in said panel opening, each of said flanges having a tongue extending outwardly from the plane of the corresponding flange adjacent said cooperating abutments, said tongues being adapted to engage said reverse side of the panel adjacent said panel opening to lock said flanges in said attached position in said panel openings, said tongues being bent outwardly in diverging relation in a spacing greater than the width of the opening and adapted to flex inwardly to pass through the opening.

References Cited in the file of this patent

UNITED STATES PATENTS

| | | |
|---|---|---|
| 2,629,157 | O'Herron | Feb. 24, 1953 |
| 2,666,968 | Bedford | Jan. 26, 1954 |